Dec. 18, 1962
W. B. MILLER ET AL
3,068,732
FLYING CUTTER CARRIAGE HAVING MECHANICAL MEANS
TO VARY THE INSTANTANEOUS ANGULAR SPEED
OF THE CUTTER CARRIAGE DRIVE SHAFT
Filed Dec. 11, 1957
2 Sheets-Sheet 1
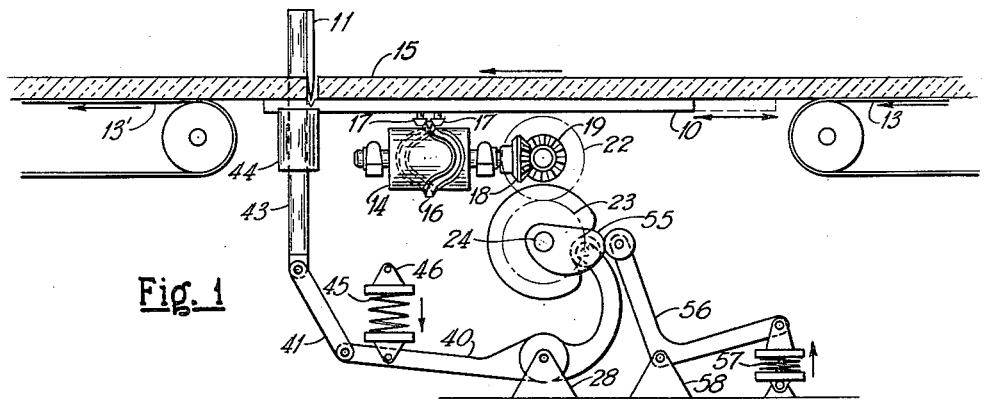
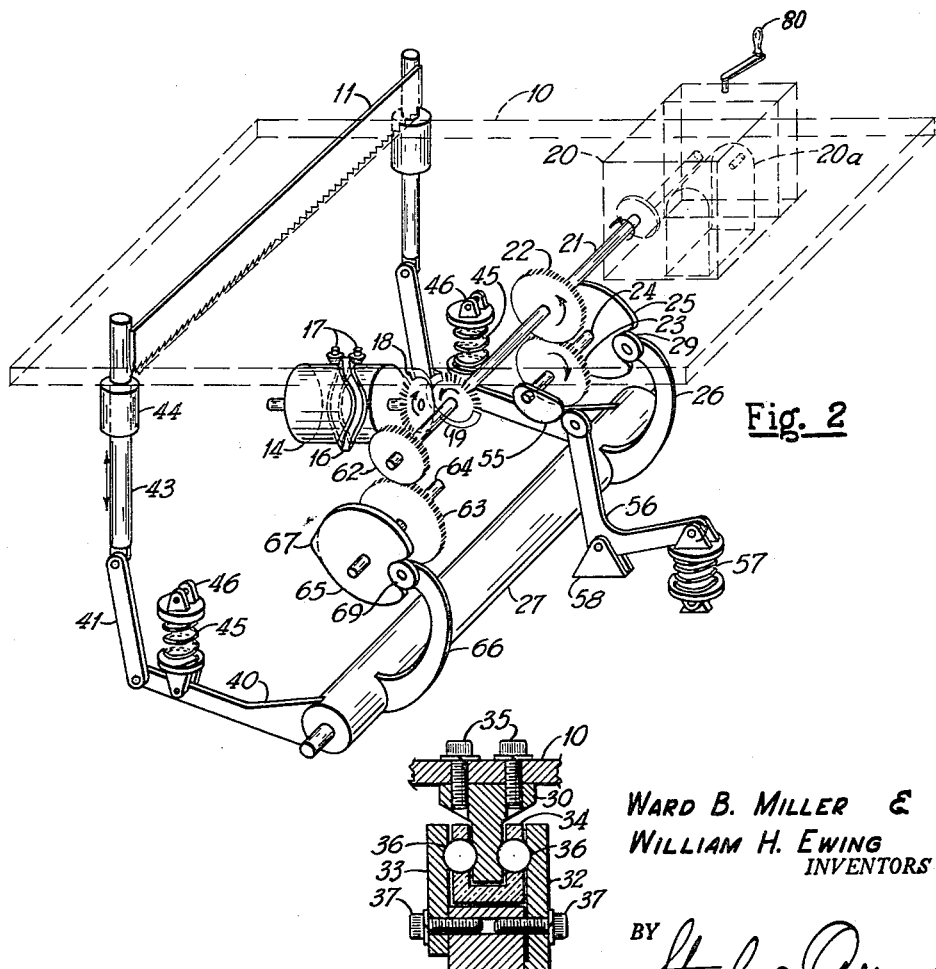
WARD B. MILLER &
WILLIAM H. EWING
INVENTORS
BY
ATTORNEYS

WARD B. MILLER &
WILLIAM H. EWING
INVENTORS

ATTORNEYS

3,068,732
Patented Dec. 18, 1962

3,068,732
FLYING CUTTER CARRIAGE HAVING MECHANICAL MEANS TO VARY THE INSTANTANEOUS ANGULAR SPEED OF THE CUTTER CARRIAGE DRIVE SHAFT
Ward B. Miller and William H. Ewing, Newark, Ohio, assignors to Owens-Corning Fiberglas Corporation, a corporation of Delaware
Filed Dec. 11, 1957, Ser. No. 702,199
4 Claims. (Cl. 83—305)

This invention relates to a cutting machine for accurate cutting of deformable material, and more particularly to a cutting machine capable of accurately severing predeterminable lengths of compressible, conformable material such as fibrous mats and the like while the material is in motion, such as on a continuously moving production line.

The cutting of compressible, conformable, or otherwise flexible material such as fibrous mats, rubber, plastic sheets, metal sheets, foil, etc., while such material is in motion as on a production line, presents difficulties in that the material can become readily jammed or drawn against the cutting element so that the material is frequently either inaccurately cut or damaged by the drawing action on the cutting member during the cutting stroke. Cutters or choppers have been provided in the past in which the cutting element and the bed on which the material is cut are moved with the material during the cutting stroke in attempts to minimize such cutting inaccuracies. A difficulty is also presented by such apparatus, however, in that the cutting rate is frequently locked positively to the speed of movement of the conveyor line and cutting bed, thus limiting the machine to a fixed cutting cycle and a fixed length of material cut. Such cutters have usually been undesirably limited however to the cutting of thin material in the range of one-half inch in thickness or less.

In view of the foregoing, it is an object of this invention to provide a new type of cutting apparatus capable of cutting thick, compressible, and/or conformable materials over a wide range of lengths while still permitting a fixed tie-in of the cutting elements with the conveying equipment, both in the cyclic cutting operation and lateral movement of the cutting elements.

It is another object of the present invention to provide a cutting machine for flexible, compressible material such as continuous wool mats, which machine is capable of cutting a wide range of thicknesses of material at any of a range of line speeds without damaging the material by either jamming or pulling during the cutting cycle.

It is another object of the invention to provide apparatus which will accurately cut flexible, compressible material to any of an infiinte number of lengths within a wide range of lengths and at any linear speed of the material within the operable range of the machine.

The above objectives are made possible according to the present invention by providing a cutting machine in which motion of the cutting table is constantly modulated during the cutting cycle, and in which the blade is moved with the material being cut. Lateral speed of the cutting blade in synchronism with the material being conveyed is accomplished by incorporation in the machine of a variable-time-base mechanism, or in other words, a variable return rate mechanism to drive the cutting table and blade. Driving the apparatus through such mechanism permits one portion of the cutting or chopping cycle to be increased in speed while another portion is retarded, or vice-versa, whereby the lateral motion of the cutting blade during the chopping portion of the cycle may be matched with the conveyor speed without affecting the pre-set chopping rate determining the lengths being cut, or permits the chopping rate to be increased for shorter lengths of material without modifying the matched relationship in speed of the table and blade with the material. The arrangement is such that for one length of cut of the material, the instantaneous rotational speed of the drum cam is uniform throughout the operating cycle, and is thus the same during the cutoff portion or forward stroke of the table, as during its back stroke of the table upon termination of a cut. For lengths of material greater than such length, the variable-time-base mechanism causes a slow-up in the instantaneous rotational speed of the drum cam during the portion subsequent to cutoff, while if the lengths to be cut are shorter, the rotational speed of the drum to the point of initiation of another cutoff stroke is considerably greater than its speed during the cutoff portion of the cycle.

Another facet of the invention is the provision of means for overcoming stalls in the cycle of operation, such as frequently occur in cutting apparatus upon termination of a cutting stroke. It is a frequent experience in chopping machines that upon completion of a cutting stroke where reversal in motion of the cutting blade takes place, extra power is required to lift the cutting blade to its starting position for initiation of another cutting stroke. By the present invention, however, a compensating cam mechanism is provided which supplies energy at just the right instant to effect lifting of the blade, thereby promoting a uniform dissipation of energy through the entire cutting cycle from initiation of a cutting action to return for initiation of another cut. This in brief is accomplished in the present apparatus by providing a compensating cam which compresses a spring during the greater portion of the cycle and then releases the energy as needed to reverse the motion of the cutting blade, thereby eliminating stall positions.

The features of the present invention lie in the wide range of thicknesses and lengths of material which can be cut without deterring from accuracy of cut.

A still further feature of the invention lies in the constant regulation or modulation of the cutting blade, both in its vertical and lateral motion during the cutting stroke; as well as an adaptability of the driving equipment to either rapid or slow return of the blade during the non-cutting portion of its cycle of operation which permits matching of the lateral motion of the blade to the speed of conveyance of the material being cut regardless of the length of material being cut.

Another feature of the invention lies in the non-stall character of the apparatus.

Other objects and features which we believe to be characteristic of our invention are set forth with particularity in the appended claims. Our invention, however, both in organization and manner of construction, together with further objects and advantages thereof may be best understood by reference to the following description taken in connection with the accompanying drawings in which:

FIGURE 1 is a schematic side elevational illustration of a cutting machine of the present invention in association with a conveyor shown feeding material thereto to be cut to predetermined length.

FIGURE 2 is a schematic isometric view of the machine illustrated in FIGURE 1.

FIGURE 3 is a partial view in cross section of the bed and track arrangement for reciprocating the table of the machine illustrated in FIGURES 1 and 2.

Figure 4:
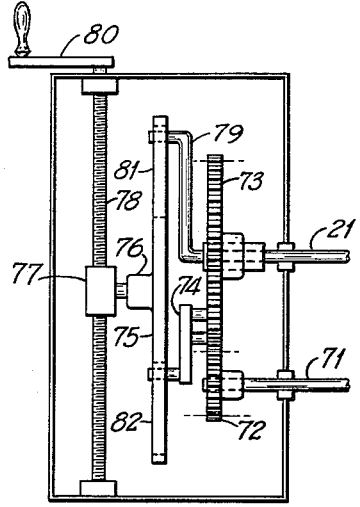
FIGURE 4 is a somewhat schematic illustration of a variable-time-base mechanism for driving the cutting or chopping machine of this invention.

Turning to the drawings in greater detail, FIGURE 1 shows a machine having a cutting blade 11 of guillotine type which reciprocates in a vertical direction as well as in a lateral direction, corresponding to the direction of motion of material being cut thereby. The lateral motion of the blade is determined by a cutting table 10 with which it is associated and with which it is fixed. The cutting table 10 shuffles forward in the direction of feed of material 15 from the conveyor 13 with each stroke of the cutting blade 11 through the material. The table moves back toward the conveyor 13 during the non-cutting portion of the cutting cycle of the machine and forwardly toward the conveyor 13' during the cutting stroke. The forward motion of the table during the cutting stroke is matched in velocity to the uniform and continuous feed rate of the material 15 on the synchronized speed conveyors 13 and 13' at the back and forward ends of the machine respectively.

The table as illustrated in FIGURE 3 is made reciprocable by provision of a track 30 fixed to the underside of the table by bolts 35 passing therethrough and threadably secured to the track. The track is supported by bearing balls 36 retained on each side of the track within a ball-retaining slide bar 34 held in position on a base 31 by a pair of side plates 32 and 33 on opposite sides of the slide bar and cooperatively associated with the balls 36 to permit movement of the bar 34 and track 30 back and forth over the base 31 by ball bearing action. The plates 32 and 33 within which the ball bearing action occurs are secured to the base 31 by bolts 37 passing therethrough and threadably secured to the base. A rotatable pinion (not shown) fixed to the ball-retaining slide bar 34 is cooperatively associated with a gear rack (not shown) on the base 31 to establish a positively aligned relationship of the slide bar 34 on the base 31.

Motion of the table 10 is effected by a cylindrical shaped drum cam 14 having a contoured tooth 16 extending around the periphery of the drum and engaged by follower members 17 projecting from the underside of the table which cause the back and forth movement of the table between the conveyors 13 and 13' upon rotation of the drum cam 14. The drum cam is driven by an electric drive unit 20 containing a drive motor 20A and a speed-reducing variable-time-base mechanism which rotates a shaft 21 to drive the drum cam through a pair of mated bevel gears 18 and 19.

The table as illustrated in FIGURE 1 and in dotted lines in FIGURE 2 is in a position midway of the conveyors 13 and 13' during the portion of the operating cycle when the cutting blade is passing through the material 15. Upon continued rotation of the drum cam 14, while the blade is being withdrawn from the material cut, the follower members 17 cause the table to move somewhat further forward toward the conveyor 13' by reason of the contouring of the tooth 16 before causing a return motion to the conveyor 13.

The chopping blade 11 is also driven by the drive unit 20 through the power shaft 21. The blade 11 is moved up and down under control of a cam 25 mounted on a cam shaft 24 which is rotatably driven through a pair of mutually engaging spur gears 22 and 23 mounted on the power shaft 21 and the cam shaft 24 respectively. The spur gears 22 and 23 have a one-to-one ratio so that for every revolution of the power shaft 21 the cam 25 is rotated through 360°. The cam 25 is engaged by a cam follower 26 extending from a pivot bar 27 mounted in a pair of pivot supports 28. The blade 11 is connected to the cam actuated pivot bar 27 by a lever arm 40 connected to the vertically reciprocable blade support bars 43 by a linking bar 41. The blade support bars 43 are reciprocably mounted on the table 10 by a pair of slide bearing members 44. The blade is biased downwardly by a compression spring 45 fixedly positioned at an end 46 and acting to push downwardly therefrom on the lever arm 40. This spring biasing action causes the cam follower 26 to be pushed into constant engagement with the cam 25, and accordingly causes it to move dependent upon the contouring of the cam 25 during its rotation by the unit 20. The cam 25 is provided with a depression 29 deep enough so that the follower 26, in making engagement with the cam within the depression, releases pressure of the arm 40 against the spring 45 so that the blade 11 is pushed downwardly by the spring 45 through the material 15 on the table 10.

When the cam follower 26 makes engagement with the cam 25 in the depression 29 during the cutting stroke, considerable extra power would normally be required to lift the follower out of the depression 29 and against the force of the spring 45, except for a counter-balance cam arrangement described hereinafter. A counter-balance cam 55 is provided to release energy into the driving system immediately upon completion of a downward stroke in the operating cycle for the machine. The counter-balance cam 55 is fixedly mounted on the cam shaft 24 and rotates in fixed relationship with the cutoff cam 25. A cam follower 56 of dog-leg shape is arranged to have one portion biased against the cam 55 and its other end linked to a compression spring 57 which exerts pressure against the leg to pivot the follower about the pivot mounts 58 for the biasing action against the cam 55. Compressive forces are built up to a peak in the spring 57 through the non-cutting portion of the operating cycle of the machine when the blade 11 is in its lower-most position during a cutting stroke, whereupon the compressive forces of the spring 57 are released through the dog-leg follower 56 to drive the cam shaft 24, and thus add to the power supplied by the unit 20 to the power shaft 21. Supplemental power is thus provided to the unit 20 in its effort to lift the blade 11 out of the material 15 for a subsequent cutting cycle.

By this arrangement, it will be seen that the table 10 and the blade 11 can be moved forwardly at a speed matched to the rate of movement of the material 15 from the conveyor 13 to the conveyor 13' as the blade 11 is passed through the material during a cutting stroke. Any predetermined fixed length of cut in a range of lengths as well as for a wide range of thicknesses of the material 15 can be effected regardless of the speed of the material 15, as long as the table speed is matched to the speed of the material during passage of the blade 11 therethrough.

To permit doubling of the length of cut for any given setting of the machine, a screen cam arrangement is provided. The screen cam 65 is mounted on a second cam shaft 64 and is rotatably driven on this shaft as an axis by the power shaft 21 through a pair of spur gears 62 and 63. The ratio between the gears 62 and 63 is as illustrated in FIGURE 2 is a two-to-one ratio so that for every revolution of the power shaft 21, the cam shaft 64 is driven through only 180°. Thus, two revolutions of the power shaft 21 are required for a complete revolution of the cam 65. The cam 65 is contoured with a depression 69 corresponding to a cutoff stroke and a high portion 67 corresponding to a cutoff blanking step. The cam 65 is engaged by a cam follower arm 66 extending from the pivot bar 27 and biased into contacting relation with the cam 65 by the force provided through the lever arm 40 from the compression spring 45.

The machine as shown in FIGURES 1 and 2 is in position where the follower arm 66 is in the cutoff depression 69, but upon completion of a full revolution of the power shaft 21, the follower arm would rest on the high portion 67 in the cam 65. If such 180° revolution of the cam were to take place from the position shown in FIGURES 1 and 2, the follower 26 would rest in a position a greater distance from the shaft 64 and thus would hold the blade 11 above the material on the table 10 so that what would otherwise be a stroke, would be blanked, or in other words, restrained from occurring. The power shaft 21 would have to rotate through another 360° before the cam 65 would be moved to a position where the follower 66 could fall into the cutoff depression 69, and where the cam follower 26 would also be allowed to fall within the cam depression 29 for release of the blade 11 so that a cutoff stroke can take place.

By this arrangement, two cycles of the machine can be made to occur before a cutting stroke occurs. Although the arrangement as illustrated is such that two cycles are completed between each cutoff stroke, it will be recognized that by substituting auxiliary gears and cams for the gear 63 and 65, a range of multiples of a single cycle of the machine can be selected to occur between cutoff strokes, thereby permitting the machine to be adjusted for long lengths of material of exacting dimension.

When the machine is to be adjusted to cut short lengths of material, the screen cam arrangement involving the gear 63 and the cam 65 can be disengaged or removed so that a cutoff stroke of the blade 11 will occur with each cycle of the machine and thereby be fully governed by the action of the cam 25.

Figure 5:
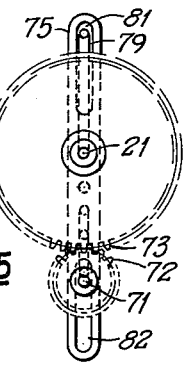
FIGURES 5 and 6 are an elevational view of the mechanism of FIGURE 4 in two different steps of a cycle of operation within which a cutting stroke is effected to illustrate the manner in which the variable-time-base mechanism operates.
Figure 6:
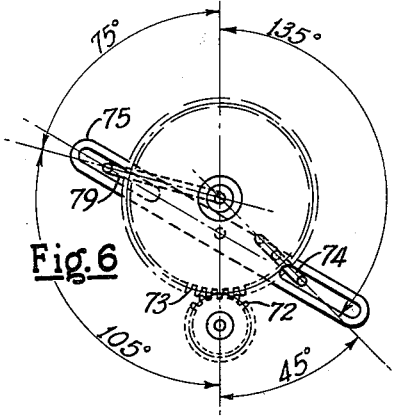

FIGURES 4 to 6 illustrate the variable-time-base mechanism incorporated in the drive unit 20 which provides adjustment whereby the angular motion of the power shaft 21 can be made to move with a desired nonuniform angular motion through the cycle of operation of the machine. By enabling adjustment of the drive mechanism with such an arrangement, a nonuniform angular motion in the power shaft 21 can be made to occur during each cycle of operation of the machine to permit adjustment for a quick return of the table and cutting blade of the machine after each cutting stroke, or alternately can be arranged to move the table back to a starting point at a slower rate than that which would take place if the angular motion in the power shaft 21 were constantly uniform. In this way, the length of the material between cuts for a given constant speed of the material on the conveyor lines can be smoothly adjusted over a wide range, while still allowing the table and blade to be moved at linear speeds matched to that of the conveyor line during the cutting stroke.

The elements of the mechanism 70 which permit adjustment for such nonuniform, angular motion during each revolution of the power shaft 21 are shown more clearly in FIGURE 4 wherein a power input shaft 71, connected with a mechanical power source, such as the electrical motor 20A, drives a spur-type gear 72 which is mated with a larger spur-type gear 73 mounted in freely rotating relation on the power output shaft 21. The gear 73 has a crank arm 74 fixed thereto and extending laterally therefrom for engagement in a slot 82 of a pivot bar 75. The pivot bar 75 has an axial hub 76 fixed to an adjustably positionable block 77 which can be raised or lowered by an adjustment screw 78 having a crank arm 80. The pivot bar 75 has a slot 81 at the end opposite to that engaged by the crank arm 74. A crank arm 79, associated directly with the power output shaft 21 makes engagement with the bar 75 in the slot 81, and accordingly is driven by the pivot bar 75 upon rotation imparted thereto by the gear 73 through its crank arm 74.

The gear 73, in being larger than the gear 71, effects a speed reduction from the drive 20A to the gear 73 and correspondingly to the pivot bar 75 and the power output shaft 21. The gear 73 with its associated crank arm 74 thus can be considered as the power input gear to the unit, since uniform rotational speed in the power input shaft 71 results in a uniform rotational speed in the gear 73. The fact that the gear 73 is freely rotatable on the shaft 21, and that the connection between the gear 73 and the power output shaft is through the pivot bar 75 and the crank arm 79, causes the instantaneous, rotational speeds of the gear and the shaft 21 to be independent of each other except for the radius arms established by the crank arms 74 and 79 with the pivot bar 75.

When the axis of the pivot bar 75 is concentric with that of the power output shaft 21 (an arrangement not illustrated) the rotational speeds of the gear 73 and the shaft 21 are identical during the entire cycle of revolution of the gear 73. This operational condition arises because the pivot bar 75 and the output shaft 21 have common axes of rotation under these physical conditions, thereby causing every angular degree of the gear 73 to be matched exactly by the pivot bar 75 and the crank arm 79 driving the output shaft 21.

Adjustment to establish a nonuniform, angular motion of the output shaft 21 for a given uniform angular speed of the input shaft 71, to establish either a quick or slow return of the table 10 and blade 11 after a cutting stroke, is accomplished by adjusting the pivot bar 75 so that an eccentricity is established between the hub axis 76 and the axis of the output shaft 21. As illustrated in FIGURES 5 and 6, the output shaft 21 moves with a different angular motion from that of the gear 73. As may be seen in FIGURE 6, when the bar axis 76 is located below the axis of the output shaft 21, the shaft 21 first moves at a relatively fast angular velocity from the position shown in FIGURE 5 for somewhat less than 90° of rotation of the gear 73 and then slows up and approaches a minimum velocity at 180° of a full revolution of the gear 73. For a 45° rotation of the arm 74 on the gear 73, the crank arm 79 driving the output shaft 21 moves through 75°. Further rotation of the arm 74 from the position shown in FIGURE 6 through 135° to a half way point in the cycle of revolution in the gear 73 causes the output shaft 21 to move only through 105°. Still further, rotation of the power input gear 73 through another half cycle of revolution from the 180° point results in continued slow revolution of the output shaft 21, but with a progressively increasing angular speed to a maximum speed at the 360° point in the cycle.

If the eccentricity is such that the hub or axis 76 of the pivot bar 75 is located above the output shaft 21 in the illustration of FIGURE 4, then the variation in angular velocity through a complete revolution of the power input gear 73 and power output shaft 21 of the unit 70 would be 180° out of phase with respect to the foregoing description. That is, on start from the position of the crank arm 74 as shown in FIGURE 6, the angular velocity of the power output shaft would be at its lowest, and at 180° in the cycle, the shaft would be rotating at its highest instantaneous velocity following which it would again become slow at the 360° point in the cycle.

In view of the foregoing, it will be seen that any of a wide range of adjustments for either a quick or slow return can be imparted to the table 10 and blade 11 while the forward motion of the table, during a more linear part of the cycle and as determined by the contour of the drum cam 14, is retained uniform through the cutting strokes for each given speed of conveyance of the material to the machine.

Figure 7:
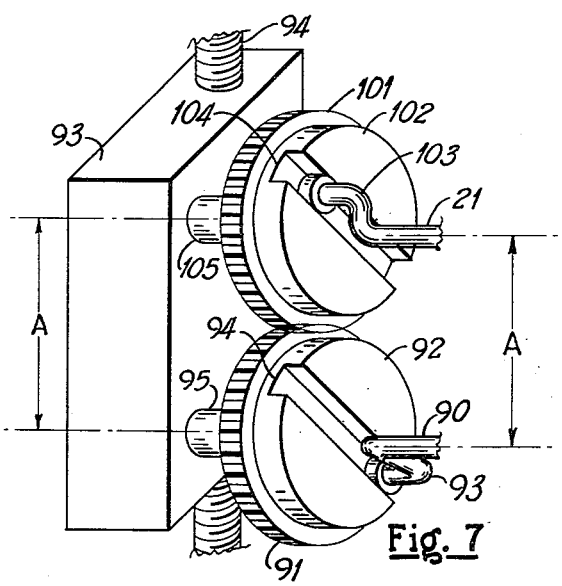
FIGURE 7 is a somewhat schematic illustration of another variable-time-base mechanism through which the machine of this invention can be driven according to the principles of the invention.

FIGURE 7 illustrates another mechanism by which the cycle of operation of the machine might be modified for a given uniform angular input speed of a shaft 90 connected with a mechanical power source. In this arrangement, a pair of gears 91 and 101 in direct engagement with each other are secured to a mounting block 93 by way of their rotatable support shafts 95 and 105 respectively and may be adjustably moved up and down with respect to their associated power input shaft 90 and power output shaft 21 respectively by an adjustment screw 94. The gears 91 and 101 have integrally associated lateral drive segments 92 and 102 respectively having similar slots 94 and 104 respectively extending diametrically across the segments. The power input shaft 90 has a crank arm 93 which makes engagement with the gear 91 in the slot 94 of the integral segment 92 at its end. Correspondingly, the power output shaft 21 makes engagement with the slot 104 of the segment 102 of the gear 101 by way of a crank arm 103 at the end of the shaft 21. The crank arms 93 and 103, however, make engagement in the respective slots 94 and 104 in a 180° out of phase relationship to establish the desired physical condition under which a nonuniform angular output is produced for a uniform angular input to the system.

When the mounting block 93 of this mechanism is moved to a position where the gears have their axes 95 and 105 in direct concentricity with the power shafts 90 and 21 respectively, uniform angular motion of the input shaft 90 drives the gears 91 and 101 with corresponding uniform angular velocity and consequently the velocity of the power output shaft 21 is also angularly uniform. If, however, the block 93 is moved to a position where the shaft 95 supporting the gear 91 is slightly eccentric with respect to the power input shaft 90, then the angular motion of the output shaft 21 will be nonuniform for uniform angular rotation of the input shaft 90. This occurs in view of the crank arm 93 taking on different radius arms at each instant during the revolution of the gear 91. Both gears 91 and 101 thus rotate with nonuniform angular motion to correspondingly produce a nonuniform angular motion in the output shaft 21 also effected by its constant variation in radius arms caused by the eccentric engagement of its crank arm 103 in the slot 104.

In each instance of application of a variable-time-base mechanism such as those indicated in the present specification, a cycle of operation represented by a single revolution of the power output shaft can be so matched by contouring of the cutoff cam and the table actuating drum cam that the table and cutoff blade are driven and moved during the cutoff portion of the operating cycle at a uniform speed corresponding to a uniform angular motion of the drive shaft or power input shaft regardless of the nonuniformity of angular motion in the other portions of the operating cycle.

In other words, the variable-time-base mechanism provides a rotational output of varying instantaneous angular speed during each cycle of rotation for uniform angular input speeds and is adjustable for greater and lesser instantaneous output speeds in portions of each cycle in comparison to the uniform angular input speed. Furthermore, the variable-time-base mechanism provides at least a portion in each cycle of rotation in which the angular output speed of the drive where the contouring of the drum cam 14 for movement of the table 10 and blade 11 enables establishment of a matching velocity of the table 10 and blade 11 with the material during the forward motion of the table and the cutting stroke.

The blade 11 as illustrated in the drawings is a saw-tooth blade designed to prevent fibrous masses from shifting sideways during a cutting stroke. Other types of blades, best adapted to cutting other materials, it will be understood, may be readily installed in the machine without requiring modification of operating principles to effectively cut such other materials.

By way of example of dimensions, proportions, and relationships of speed of a specific machine made according to the principles of the present invention, when the blade stroke is in the order of seven inches, it accordingly can be arranged to handle material up to approximately six inches in thickness. The stroke of a table in such an arrangement may be made to be in the order of eight inches. To further clarify operational features of the machine, line speeds and related lengths of batts of fibrous material capable of being cut at uniform input rotational speeds to the variable-time-base mechanism are set forth below:

| Line Speed, f.p.m. | Output Speed From Variable-Time-Base Mechanism in r.p.m. or Cuts Per Min. | Length of Cut in Inches |
| --- | --- | --- |
| 200 | 160 | 15 |
|  | 133⅓ | 18 |
|  | 50 | 48 |
| 100 | 80 | 15 |
|  | 66⅔ | 18 |
|  | 25 | 48 |
| 10 | 8 | 15 |
|  | 6⅔ | 18 |
|  | 2.5 | 48 |

Each revolution of the variable-time-base mechanism represents a cut by the machine. Further to illustrate the cooperative relationship of elements of this machine, it is again pointed out that the table speed is always matched to the line speed, and that the forward motion of the table for any given line speed is substantially fixed regardless of the nonuniformities in velocities during the remaining portion of the cycle of operation of the machine. A starting point might be represented at 0° midway in the forward stroke of the table, while the blade is down to its lowermost position. Representative of a nonuniform time cycle for the machine, the blade at 60° in time may be in an upmost position, while at 95° the table is fully forward and ready to return to its back position. At 180° of the operating cycle, the table may be midway in its backward stroke, while at 265° it can be fully back and ready to start forward again. At the 300° point in time, the blade can be ready to start into cutoff, and at 360°, the blade would again be at its lowermost position midway in the forward stroke of the table.

While we have shown certain partcular forms of our invention, it will be understood that we do not wish to be limited thereto since many modifications may be made within the concepts of the invention and we, therefore, contemplate by the appended claims to cover all such modifications which fall within the true spirit and scope of our invention.

We claim:

1. A machine for cutting continuous moving material to any of a range of preselectable lengths while the material is in lineal motion as on a conveyor line comprising a cutting table to which material is fed to be cut, a cutting blade on said table, a rotatable drum cam cooperatively associated with said table to effect reciprocation thereof with said blade in the direction of feed of said material during a cutting stroke, rotating drive means for said table and blade, said table and blade being driven by said drive means through a crank mechanism and variable lever arm means adapted to varying instantaneous angular speeds of an output shaft during each cycle of rotation for uniform angular speeds of said drive means, said variable lever arm means being adjustable to vary the effective rotational lever of the output shaft for greater and lesser instantaneous angular output speed in portions of each cycle of rotation of said outward shaft in comparison to the angular input speed of said drive means, said drum cam being cooperatively contoured and matchedly associated with said variable lever arm means to drive said table and blade in at least one portion of each cycle of said mechanism at a uniform forward speed matched to that of said material and said blade being associated with said drive for a cut of said material during the forward motion of said table.

2. A machine for cutting material continually fed thereto to any of a range of preselectable lengths while in motion, comprising a cutting table on which the material is fed, a cutting blade on said table, a drive shaft, a mechanical power source, said shaft being driven by said source through a variable-time-base mechanism comprising variable lever means with a changing effective fulcrum for variation of the instantaneous angular speed of said shaft during each revolution thereof for a uniform angular input speed to said mechanism from said power source, a rotatable drum cam driven by said drive shaft and cooperatively associated with said table to effect reciprocation thereof with said blade in the direction of feed of said material during a cutting stroke, said cutting blade being controlled by a cam driven by said shaft to lift the blade from said table, said blade being biased toward said table and arranged to be released by said cam at a given point of rotation of said shaft after lifting of said blade for a cutting stroke, the variable lever means of said variable-time-base mechanism being adjustable in the positioning of its effective fulcrum to provide a nonuniform instantaneous output speed in portions of each revolution of said shaft for a uniform angular input speed thereto while at least a portion of each revolution of the shaft is substantially uniform for such uniform input speed, said drum cam being cooperatively contoured and associated with said variable-time-base mechanism to drive said table and blade at a uniform speed matched to the material speed for a finite portion of its forward motion, and said blade being arranged for release for a cutting stroke and withdrawal from the material during the uniform speed forward motion of said table and blade, said variable-time-base mechanism also being adjustable to provide a varying angular speed of said shaft during the noncutting portion of each revolution of said shaft as determined by the length to which the material is being cut.

3. A machine for cutting material continually fed thereto to any of a range of preselectable lengths while in motion, comprising a cutting table on which the material is fed, a cutting blade on said table, a drive shaft, a mechanical power source, said shaft being driven by said source through a variable-time-base mechanism comprising a variable lever means with a changing effective fulcrum for variation of the instantaneous angular speed of said shaft during each revolution thereof for a uniform angular input speed to said mechanism from said power source, a rotatable drum cam driven by said drive shaft and cooperatively associated with said table to effect reciprocation thereof with said blade in the direction of feed of said material during a cutting stroke, said cutting blade being controlled by a cam driven by said shaft to lift the blade from said table, said blade being biased toward said table and arranged to be released by said cam at a given point of rotation of said shaft after lifting of said blades for a cutting stroke, the variable lever means of said variable-time-base mechanism being adjustable in the positioning of its effective fulcrum to provide a nonuniform instantaneous output speed in portions of each revolution of said shaft for a uniform angular input speed thereto while at least a portion of the shaft is uniform for such uniform input speed, said drum cam being cooperatively contoured and associated with said variable-time-base mechanism to drive said table and blade at a uniform speed matched to the material speed for a finite portion of its forward motion, said variable-time-base mechanism being adapted to drive said table and blade during the noncutting portion of the cycle of rotation of said shaft at nonuniform speeds determined by the length to which the material is being cut, said blade being arranged for release for a cutting stroke and withdrawal from the material during the uniform speed forward motion of said table and blade, a counterbalance cam having a contoured periphery, a spring biased cam follower making biasing contact with the contoured periphery of said cam, said cam being driven by said shaft, said cam being contoured and disposed to effect a gradual build-up of the biasing energy of said follower upon completion of a cutting stroke of said blade and to release its biasing energy to aid said shaft in lifting said blade from said table immediately after a cutting stroke.

4. A machine for cutting material to preselectable lengths while the material is in continuous linear motion as on a conveyor line comprising a movable table reciprocable over a given distance in the direction of material fed thereto, a cutting blade extending across said table transversely to the direction of motion of the material, said blade being reciprocable for cutting and withdrawal from material on said table, said blade also being movable reciprocably in matched relation with the motion of said table over said given distance, said table and chopping blade being driven through a variable-time-base drive, said drive including lever arm means adjustable in the positioning of its effctive fulcrum, said drive also including means or varying the position of the effective fulcrum of said lever arm means and adapted to drive the table at a uniform speed matched to the material speed during the cutting stroke and at nonuniform speeds during the noncutting portion of the cycle as determined by the length to which the material is being cut.

References Cited in the file of this patent
UNITED STATES PATENTS

| 807,239 | Britton | Dec. 12, 1905 |
| 1,404,183 | Augustine | Jan. 24, 1922 |
| 1,628,939 | Wells | May 17, 1927 |
| 1,798,929 | Candee | Mar. 31, 1931 |
| 1,937,152 | Junk | Nov. 28, 1933 |
| 2,021,077 | Merrill et al. | Nov. 12, 1935 |
| 2,278,786 | Johnston | Apr. 7, 1942 |
| 2,322,340 | Bechler | June 22, 1943 |
| 2,484,854 | Peters | Oct. 18, 1949 |

FOREIGN PATENTS

| 784,689 | France | May 6, 1935 |
| 968,699 | France | May 3, 1950 |